United States Patent [19]

Stadtfeld

[11] Patent Number: 5,000,632

[45] Date of Patent: Mar. 19, 1991

[54] DUPLEX METHOD OF MANUFACTURING A GENERATED SPIRAL-TOOTHED BEVEL GEAR OF A BEVEL-GEAR OR HYPOID-GEAR DRIVE

[75] Inventor: Hermann Stadtfeld, Dielsdorf, Switzerland

[73] Assignee: Werkzeugmaschinenfabrik Oerlikon-Buhrle AG, Zurich, Switzerland

[21] Appl. No.: 552,471

[22] Filed: Jul. 16, 1990

[30] Foreign Application Priority Data

Sep. 4, 1989 [CH] Switzerland ................ 03202/89

[51] Int. Cl.⁵ .............................................. B23F 9/10
[52] U.S. Cl. .................................... 409/26; 51/287; 409/30
[58] Field of Search ................ 409/25, 26, 27, 28, 409/29, 30; 51/287

[56] References Cited

U.S. PATENT DOCUMENTS

4,611,956  9/1986  Kotthaus ............................. 409/26

FOREIGN PATENT DOCUMENTS

0046311  2/1982  European Pat. Off. .
417284   1/1967  Switzerland .

OTHER PUBLICATIONS

"Generated Spiral Bevel Gears: Optimal Machine-Tool Settings and Tooth Contact Analysis", NASA Technical Memorandum No. 87075, USAAYSCOM Technical Report 85-C-9, 1985 of Faydor L. Litvin et al.

"Anforderungsgerechte Auslegung Bogenverzahnter kegelradgetriebe", 1987, thesis of Hermann J. Stadtfeld, approved by the Faculty for Mechanical Engineering of the Rheinisch-Westfälischen Technical University, Aachen, West Germany.

*Primary Examiner*—Z. R. Bilinsky
*Attorney, Agent, or Firm*—Sandler, Greenblum & Bernstein

[57] ABSTRACT

For manufacturing a pinion of a pair of mating bevel gears having contact-line tooth bearing or crowning in accordance with the method developed by Litvin et al, the cutter radii of respective outer and inner blade edges in the duplex or double-cut method and therewith the centers of rotation of the cutter heads as well as the center of rotation of a generating gear are altered in relation to the settings for manufacturing the mating or meshing gear. This would require cutter heads provided with adjustable cutter radii. In order to render possible the use of commercially available cutter heads, provision is made for achieving the alternation of the cutter radii by inclination of the cutter-head axes.

1 Claim, 3 Drawing Sheets

DUPLEX METHOD OF MANUFACTURING A GENERATED SPIRAL-TOOTHED BEVEL GEAR OF A BEVEL-GEAR OR HYPOID-GEAR DRIVE

BACKGROUND OF THE INVENTION

The present invention broadly relates to generated spiral bevel gears and pertains, more specifically, to a new and improved duplex or double-cut method of manufacturing a generated spiral-toothed bevel gear, particularly the pinion of a bevel-gear or hypoid-gear drive, on a gear-cutting machine.

In its more particular aspects, the present invention specifically relates to a new and improved duplex method of manufacturing a generated spiral-toothed bevel gear on a gear-cutting machine by cutting concave and convex tooth flanks or surfaces by means of cutter heads rotating about respective cutter-head axes and provided with cutters comprising outer and inner blade edges, respectively, whereby there is generated an approximate contact-line tooth bearing or crowning with conjugating tooth flanks of a mating or meshing gear, in that the cutter radii of the outer and inner blade edges and therewith the respective centers of rotation of the cutter heads as well as the center of rotation, i.e. the generating drum axis, of a generating gear are altered in relation to settings or values for manufacturing the mating or meshing gear such that the connecting lines of the centers of rotation of each cutter head and of the generating gear form a parallelogram for the conjugate gear tooth flanks or surfaces of gear and pinion.

The basis for all realized or existing types of bevel-gear tooth systems is the exact toothing or gear-tooth forming with congruent generating gears for generating the pinion and the crown gear, so that pinion and crown gear in the process of meshing fulfil the basic requirement of a gear tooth system in every rolling contact position. Permanent line contact prevails between the meshing or engaged flanks or surfaces. In other words, the crown-gear flank or surface is an exact conjugation of the pinion flank or surface, so that the exact toothing can also be designated as conjugate gear toothing, meaning that the gear ratio is essentially constant during the tooth engagement cycle.

In order to produce congruent generating gears, there is required a geometrical and kinematical adaptation of the gear-cutting machines for the pinion and crown gear. The most significant value or magnitude is thereby the proportional or parallel profile of the tooth depth. There is no connection between the form or profile of the flank line and the position of the generating gears and the congruence of the generating gear flanks, respectively. The manufacture of mating conjugate gear wheels depends solely on the arrangement between the generating drum, the cutter head and the gear blank of the pinion and crown-gear cutting machine.

Exact gear toothings are unsuitable for real or practical use because, for example, oblateness under load conditions, assembly tolerances in the gear box, shaft bearing or mounting systems, toothed-wheel rims and teeth etc., can lead to considerable trouble and malfunction during operation. Therefore, practical toothings comprise flank crowning in order to achieve a localized tooth bearing. There are particularly known elevational tooth bearing, lengthwise crowning and generation crowning as well as higher-order generation-dependent corrections. For instance, elevational tooth bearing is generated by cutter sphericity, while lengthwise crowning is generated by different cutter radii or by inclining the cutter head spindle as disclosed, for example, in Swiss Pat. No. 417,284, published Jan. 31, 1967 of the present assignee, Oerlikon-Bührle AG, located in Zurich, Switzerland. Generation crowning is generated by kinematic effect. In most cases, there is used a combination of such flank or tooth surface corrections in the manufacturing process of bevel gears with proportional as well as parallel tooth depths. However, localized tooth bearing leads to a basically undesired rotational or kinematic error which depends on the size of the crowning correction.

Known partial generating methods or continuous generating methods for manufacturing spiral-toothed bevel gears having proportional or parallel tooth depths thus relate to gear-cutting machine corrections which ensure the running capability or ability of toothings and, furthermore, make use of the expensive mechanisms to simultaneously optimize the contact behavior as well as to improve the kinamatic conditions during the machining process. It is thereby intended to provide an ideal gearing of wheels which under any possible load ensures a perfect transmission of rotation, i.e. without kinematical error, and possesses a defined tooth bearing or tooth contact displacement behavior dependent solely upon the offset of axes.

In a Technical Memorandum prepared by Faydor L. Litvin et al for the 1985 Off-Highway and Power Plant Congress and Exposition sponsored by the Society of Automotive Engineers, Milwaukee, Wis., Sept. 9–12, 1985, entitled "Generated Spiral Bevel Gears: Optimal Machine-Tool Settings and Tooth Contact Analysis", SAE Technical Paper Series 851573, NASA Technical Memorandum 87075, a method for deriving optimal machine settings for manufacturing generated spiral bevel gears with proportional tooth depths was made known for the first time and according to which a bearing contact or contact-line crowning can be generated without kinematic errors. The suggested corrective measures for improved bearing contact are based on an alteration of the cutter radius and on an imagined parallel and equal displacement of the center of rotation of the generating gear and of the cutter-head axis when the tooth flanks of the pinion are generated in relation to the associated tooth flanks of the mating gear.

However, a variable cutter radius requires a cutter head with continuously adjustable or variable cutters, in order to exactly adjust the required radius of the inner and outer blade edges by distances in the range of approximately 1 mm to 10 mm. This has a negative effect with respect to precision and rigidity. Such cutter heads, in most cases equipped with a reduced number of cutters, have been hitherto fabricated only for laboratory tests or then commercially available cutter heads were specially modified for such laboratory tests. Furthermore, the contact-line crowning or tooth bearing which is a spatial curve requires different machine settings for generating the thrust flanks and the tension flanks and, therefore, precludes the cutting of both tooth flanks at the pinion with one cutter head in one pass or operation and, in other words, precludes the single-cut method or the double-flank cutting method. However, the actually required duplex or double-cut method, in which adjacent flanks, i.e. a thrust flank and a tension flank, are separately cut by respective cutter heads, renders possible highly optimized bevel gear drives, particularly with respect to quiet running and mechanical strength. Moreover, the duplex or double-cut method is at present the only known method for generating correct or pure contact-line crowning or localized tooth bearing.

SUMMARY OF THE INVENTION

Therefore, with the foregoing in mind, it is a primary object of the present invention to provide a new and improved duplex method of manufacturing a generated spiral-toothed bevel gear of a bevel-gear or hypoid-gear drive and which method does not exhibit the aforementioned drawbacks and shortcomings of the prior art.

Another and more specific object of the present invention aims at providing a new and improved duplex or double-cut method of manufacturing a generated spiral-toothed bevel gear and by means of which the aforesaid known method developed by Litvin et al for the manufacture of a pinion of a bevel gearing pair is improved such that the known method can be practically and economically carried out.

Now in order to implement these and still further objects of the present invention which will become more readily apparent as the description proceeds, the new and improved duplex method of manufacturing a generated spiral-toothed bevel gear is manifested, among other things, by the features that the alteration of the cutter radii of respective outer and inner blade edges is accomplished by inclining the cutter-head axes in that the cutter-head axes are inclined in a direction remote or away from main contact points located at the blade edges of the cutters, whereby the points of intersection of the cutter-head axes with normals at the aforesaid main contact points constitute the altered centers of rotation of the cutter heads.

The advantages achieved by the inventive method are essentially seen in the fact that commercially available cutter heads can now be used for the manufacture of bevel gears with proportional as well as with parallel gear depths.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Describing now the drawings, it is to be understood that to simplify the showing thereof, only enough of the construction for performing the inventive duplex method of manufacturing a generated spiral bevel gear of a bevel-gear or hypoid-gear drive has been illustrated therein as is needed to enable one skilled in the art to readily understand the underlying principles and concepts of this invention.

Figure 1:
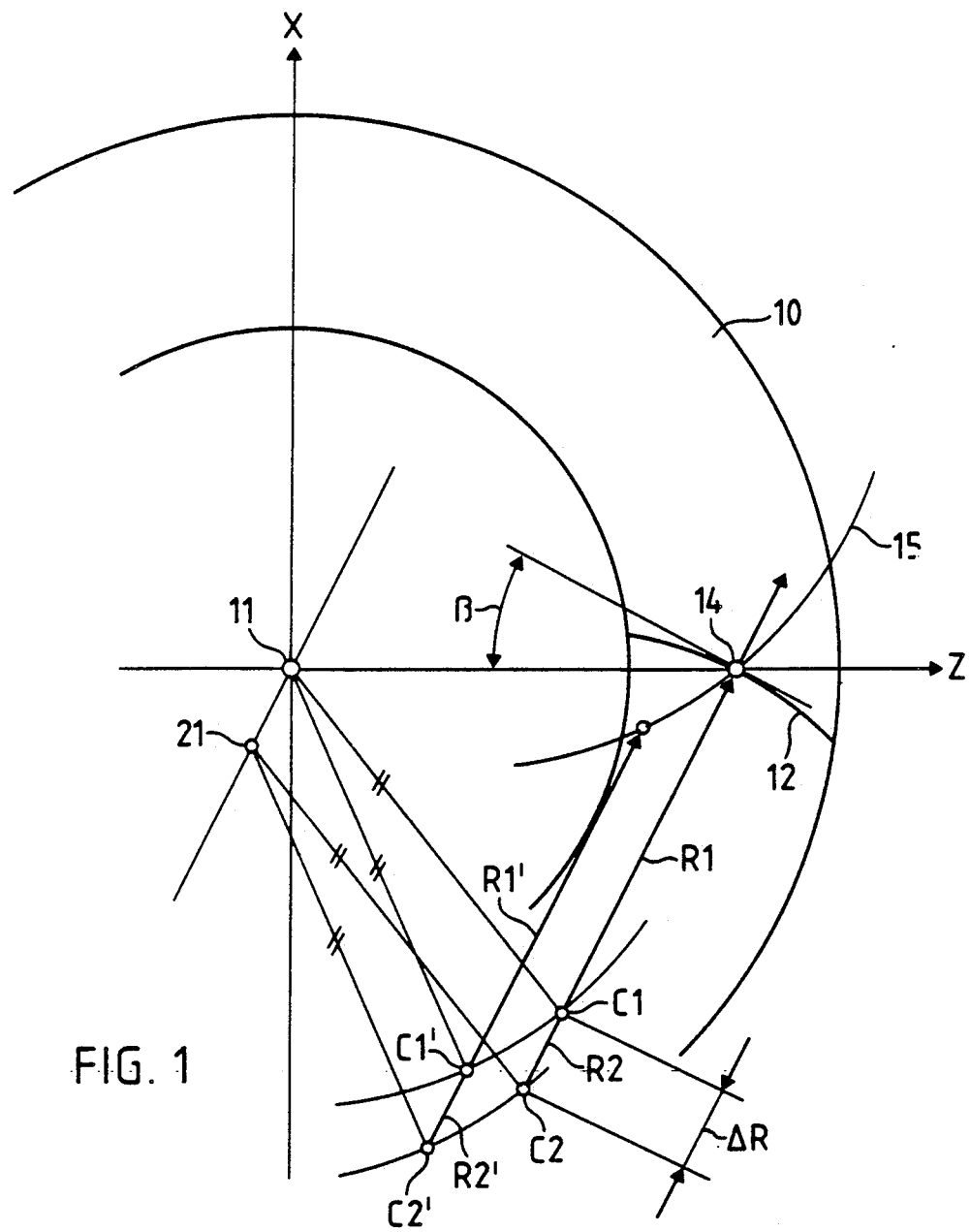
FIG. 1 schematically shows the constructive conception of the contact-line crowning or localized tooth bearing in accordance with the method developed by Litvin et al.

Turning attention now specifically to FIG. 1 of the drawings, the constructive conception of the contact-line crowning or localized tooth bearing according to Litvin et al schematically illustrated therein shows a generating gear 10 comprising a center of rotation 11 which, for example, is located at an imagined generating drum axle, and a flank line 12 having a main contact point 14 and a respective spiral angle $\beta$.

Figure 1A:
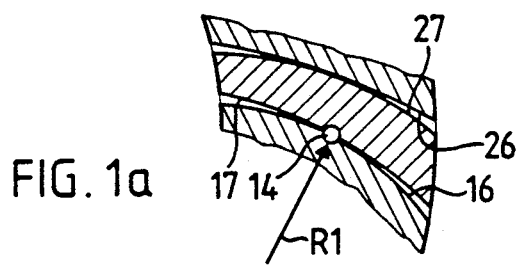
FIG. 1a shows a fragmentary sectional view through a crown-wheel tooth space and a pinion tooth.

A center of rotation C1 represents a cutter-head axis. The connecting line from this center of rotation C1 to the main contact point 14 constitutes a cutter radius R1 of an imagined cutter head for generating a crown gear, for instance, the cutter radius of the inner blade edges for generating convex flank lines 16 of the crown gear (FIG. 1a).

For generating a pure contact-line crowning or localized tooth bearing, Litvin et al propose altering the cutter radius and thereby the center of rotation of a cutter head for generating an associated pinion, whereby now likewise the center of rotation of the generating gear is to be altered in the same direction.

With reference to FIG. 1, there are thus provided the following new settings, for example, for the generation of concave flank lines 17 of the pinion to be generated with the outer blade edges of a cutter head.

A new cutter-head radius R2 is now longer by a displacement $\Delta R$ and the cutter head now rotates about a center of rotation C2. By an equal displacement in the same direction, the center of rotation 11 of the generating gear 10 is now located at a new center of rotation 21. The connecting lines of the centers of rotation 11, 21, C1 and C2 form a parallelogram. If this parallelogram is moved about the two centers of rotation 11 and 21, the arrow heads of the cutter radii R1 and R2 define a line or curve 15 of equal generating or pressure angles, without any flank or tooth surface correction. This is apparent from further centers of rotation C1', C2' and respective cutter radii R1' and R2'. The line or curve 15 forms in the tooth contact analysis the "path of contact" which leads to substantially zero kinematic errors within the area of the flank.

Figure 2A:
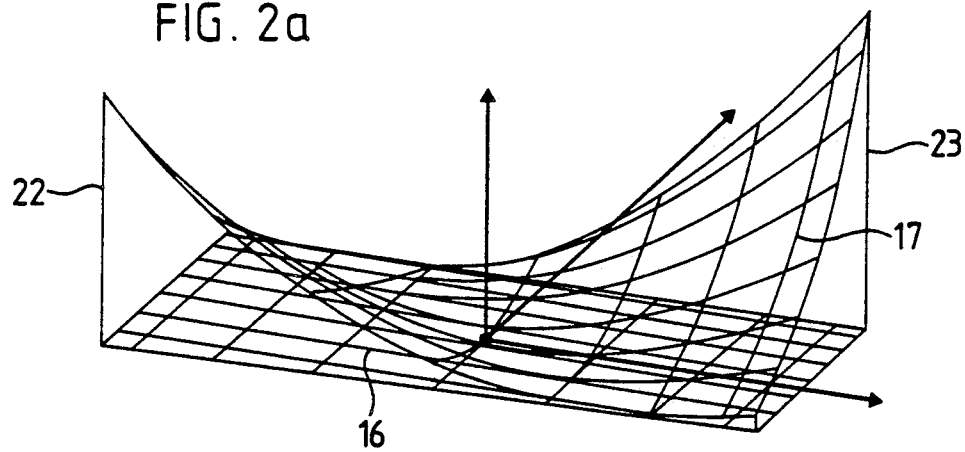
FIG. 2a shows a tooth contact analysis of the contact-line crowning or localized tooth bearing in an ease-off illustration.
Figure 2B:
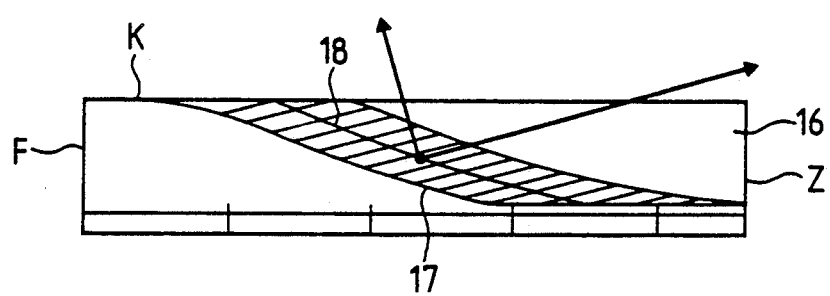
FIG. 2b shows a tooth contact analysis of the contact-line crowning with the illustration of a localized tooth bearing.
Figure 2C:
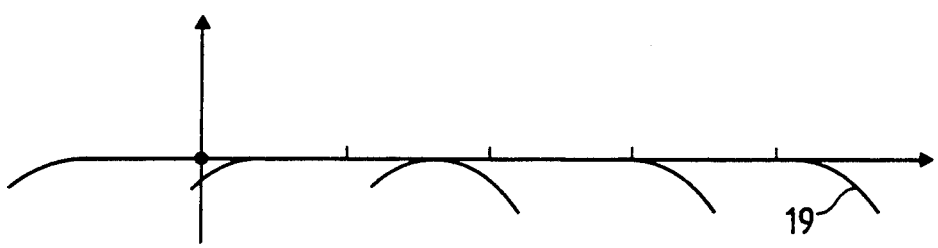
FIG. 2c shows a tooth contact analysis of the contact-line crowning with the illustration of rotation transfer.

FIGS. 2a, 2b and 2c show in three illustrations the results of tooth contact analysis of the tension sides of a toothing comprising contact-line crowning or tooth bearing according to Litvin et al, whereby:

according to FIG. 2a, an ease-off illustration shows a flank surface 16 of the crown gear and a flank surface 17 of the associated pinion;

according to FIG. 2b, a tooth bearing or localized tooth contact shows the flank surface 16 of the crown gear with the regions designated K for head, F for heel and Z for toe, as well as a "path of contact" 18 with the flank surface 17 of the associated pinion; and according to FIG. 2c, a rotation transfer shows respective rotational or kinematic errors 19 in multiple meshing.

According to the ease-off illustration in FIG. 2a, the flank surface 17 of the pinion is twisted relative to the flank surface 16 of the associated crown wheel by two diagonally opposite maximum air-gap values 22 and 23 of, for example, approximately 0.15 mm and 0.2 mm respectively. In the central area or region of the flank the contact lines possess a constant length in the tooth bearing depicted in FIG. 2b and which is given by the constant contact-line crowning. There is thus a "bias-in" tooth bearing. Kinematic errors do not occur in the potential flank area or region. Only during entry of the tip edge and upon exit at the transfer line there can occur minor kinematic errors 19. Exact transfer of rotation or movement thus takes place during multiple meshing.

If there is used a gear-cutting machine with a generating drum, the centers of rotation 11 and 21 must be located on the generating drum axis. Since this generating drum axis cannot be displaced or altered from 11 to 21, only the cutter radius changes from R1 to R2 in FIG. 1. In order to achieve a relative alteration of position of the pinion with respect to the generating drum and the cutter head, the pinion and the cutter head are correspondingly re-set at the gear-cutting machine and in addition there also result new blade-edge angles at the respective cutters of the cutter head. This is disclosed in prior art literature of Litvin et al and is therefore not further discussed hereinbelow. Furthermore, to generate the other pinion flanks with the convex flanks 27 depicted in FIG. 1a, the cutter radius is shortened by a predetermined amount in relation to the respective cutter radius for generating the concave flanks 26 of the crown gear. The centers of rotation 11 and C1 are then to be correspondingly altered in the same direction.

According to the inventive method there is now suggested that the change or alteration of cutter radii for generating the convex and concave tooth flanks for the pinion is not achieved by corresponding measures at the cutter head, but by inclination of the cutter-head axis in a predetermined direction and by a predetermined amount.

Figure 3:
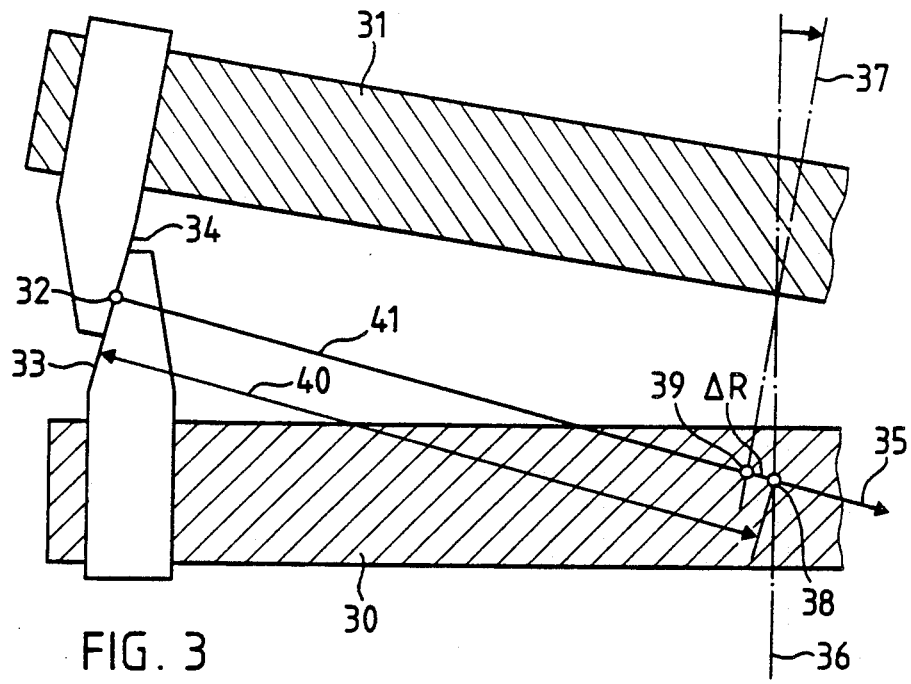
FIG. 3 schematically shows a first side view, partially in section, of two cutter heads in a mutual position in the process of cutting tooth flanks or surfaces.
Figure 4:
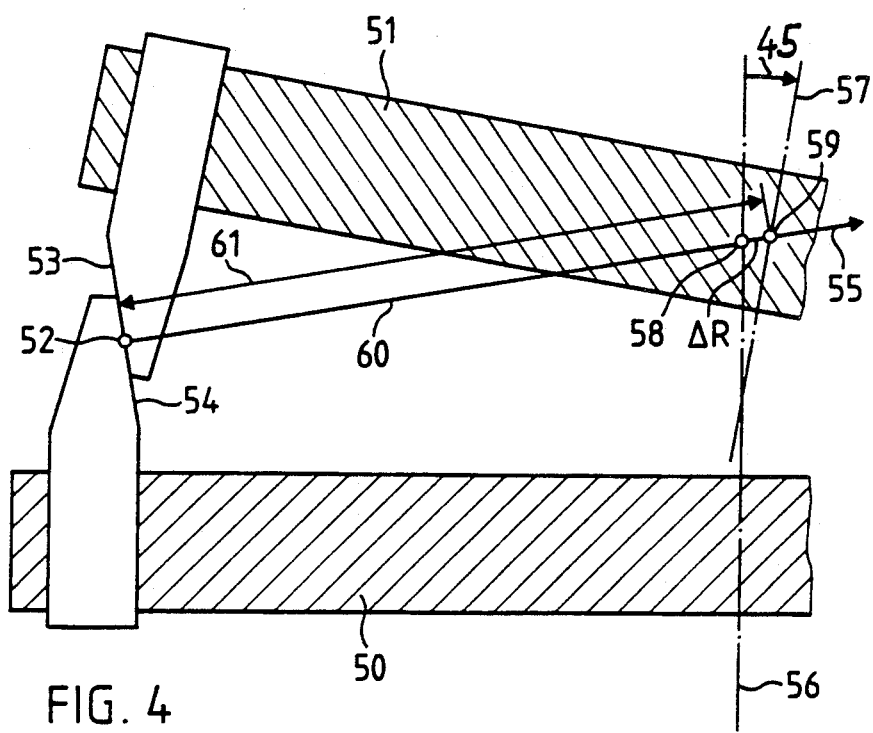
FIG. 4 schematically shows a second side view, partially in section, of two cutter heads in a mutual position in the process of cutting tooth flanks or surfaces.

In FIGS. 3 and 4 there is illustrated in simplified manner the influence of the aforesaid inclination of the cutter-head axis upon the cutter radius.

In FIG. 3, two cutter heads 30 and 31 are arranged opposite to one another such that a main contact point 32 is mutually located at an outer blade edge 33 and at an inner blade edge 34. Axes 36 and 37 of the cutter heads 30 and 31, respectively, thereby intersect one another. The two cutter head axes 36 and 37 are likewise intersected by a common normal 35 relative to the blade edges 33 and 34 and located at the main contact point 32. These points of intersection are suitably designated by reference numerals 38 and 39.

In FIG. 4, two cutter heads 50 and 51 are arranged opposite to one another such that a main contact point 52 is mutually located at an outer blade edge 53 and an inner blade edge 54. Axes 56 and 57 of the cutter heads 50 and 51, respectively, thereby intersect each other. The two cutter heads 50 and 51 are likewise intersected by a common normal 55 relative to the blade edges 53 and 54 and located at the main contact point 52. These points of intersection are suitably designated by reference numerals 58 and 59.

The cutter head 30 (FIG. 3) and the cutter head 50 (FIG. 4) are identical in this exemplary embodiment and serve to cut the tooth spaces of a not particularly illustrated crown wheel. In other words, the outer blade edges 33 cut the concave tooth flanks and the inner blade edges 54 cut the convex tooth flanks.

The convex tooth flanks of a not particularly illustrated pinion are cut by the inner blade edges 34 of the cutter head 31, while the concave tooth flanks of the aforesaid pinion are cut by the outer blade edges 53 of the cutter head 51.

The inclination of the cutter heads 31 and 51 according to the inventive duplex or double-cut method of manufacturing the aforesaid pinion is accomplished in the following manner:

The normal 55 depicted in FIG. 4 and extending between the main contact point 52 and the point of intersection 58 corresponds to an effective or actual cutter radius 60 of the inner blade edges 54 of the cutter head 50 for generating the convex tooth flanks of the aforesaid crown wheel. The normal 55 extending between the main contact point 52 and the other point of intersection 59 corresponds with an effective or actual cutter radius 61 of the outer blade edges 53 of the cutter head 51 for generating the concave tooth flanks of the pinion. The distance between the points of intersection 58 and 59 is designated in FIG. 4 by reference character $\Delta R$.

The illustration in FIG. 4 corresponds with that in FIG. 1 with respect to the tooth flanks and to the cutter radii of the two cutter heads 50 and 51, i.e. the cutter radii 60 and R1 are shorter than respective cutter radii 61 and R2, whereby this difference in the embodiment depicted in FIG. 4 is achieved by an inclination of the cutter-head axis 57 in the direction of the arrow 45 and thus in a direction away or remote from the main contact point 52. The points of intersection 58 and 59 now correspond with the centers of rotation C1 and C2 depicted in FIG. 1 and form the centers of rotation of the cutter heads 50 and 51.

In analogous manner there results in FIG. 3 an effective or actual cutter radius 40 for the outer blade edges 33 of the cutter head 30 for generating the concave tooth flanks of the crown wheel and an effective or actual cutter radius 41 for the inner blade edges 34 of the cutter head 31 for generating the convex tooth flanks of the pinion, whereby in correct manner the cutter radius 41 is shorter than the cutter radius 40 and the points of intersection 38 and 39 form the centers of rotation for the cutter heads 30 and 31. Quite unexpectedly, this is however achieved by an inclination of the cutter-head axis 37 in the same direction as in FIG. 4, i.e. in a direction away or remote from the main contact point 32.

By virtue of this inclination of the cutter head axes 37 and 57 for the purpose of altering or changing the cutter radii of the cutter heads 31 and 51 of the pinion in connection with the relative alteration or change of position of the pinion with respect to the center of rotation 11 of the generating gear 10, a contact-line crowning or localized tooth bearing can now be generated or produced by commercially available cutter heads, so that the inventive method can be practically and economically utilized.

Crown wheels can be generally fabricated by the known single-cut method. Pinions are processed, for instance according to the duplex or double-cut method, in the first place by an entering knife cutter and an outer or external cutter for producing the concave tooth flanks. Subsequently, the machine is reset or readjusted and the convex tooth flanks are processed by a cutter head which is only equipped with inner or internal blade edges.

In the case of automatically readjustable gear-cutting machines it is also possible to roughen the tooth spaces by a fully equipped cutter head in a first machine setting. The machine then automatically readjusts and smoothes, for example, the convex flanks. The machine again readjusts thereafter in order to smooth the concave tooth flanks. In this manner, pinions can be economically cut by one cutter head and in accordance with the inventive duplex or double-cut method which, in fact, relates to the tooth flank smoothing.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A duplex method of manufacturing a generated spiral-toothed bevel gear, particularly of a bevel-gear or hypoid-gear drive, on a gear-cutting machine, comprising the steps of:

cutting concave and convex gear-tooth flanks by means of cutter heads rotating about respective cutter-head axes and provided with cutters comprising outer and inner blades, respectively;

said step of cutting concave and convex gear-tooth flanks entailing the step of generating an approximate contact-line crowning with conjugating gear-tooth flanks of a mating gear;

said step of generating an approximate contact-line crowning entailing the step of altering the cutter radii of the outer and inner blade edges and therewith the step of altering the centers of rotation of the cutter heads as well as the center of rotation of a generating gear in relation to the values for manufacturing the mating gear such that connecting lines of the respective centers of rotation of each cutter head and of the generating gear form a parallelogram for the conjugate tooth flanks of the generating gear and the generated pinion; and said step of altering the cutter radii of the outer and inner blades entailing the steps of inclining the cutter-head axes in a direction remote from main contact points located at the outer and inner blade edges of the cutters and determining the altered centers of rotation of the cutter heads by the points of intersection of the inclined cutter-head axes with normals at the main contact points.

* * * * *